United States Patent [19]

Bodine

[11] 4,257,648

[45] Mar. 24, 1981

[54] NON-RESONANT CYCLIC DRIVE SYSTEM EMPLOYING RECTIFICATION OF THE CYCLIC OUTPUT

[76] Inventor: Albert G. Bodine, 7877 Woodley Ave., Van Nuys, Calif. 91406

[21] Appl. No.: 28,041

[22] Filed: Apr. 9, 1979

[51] Int. Cl.$^{3}$ ........................ B25D 11/06; A01B 35/00

[52] U.S. Cl. .......................................... 299/37; 74/61; 173/49; 299/14; 172/40

[58] Field of Search ............. 299/14, 37; 37/DIG. 18; 172/40; 175/55; 173/49; 74/61

[56] References Cited

U.S. PATENT DOCUMENTS

| | | | |
|---|---|---|---|
| 1,490,006 | 4/1924 | Goldschmidt | 173/49 |
| 1,911,813 | 5/1933 | Decker | 173/49 X |
| 2,039,679 | 5/1936 | Byers | 173/49 X |
| 2,176,801 | 10/1939 | Pinazza | 173/49 |
| 2,545,245 | 3/1951 | Stutz | 173/49 |
| 3,628,265 | 12/1971 | Galis | 37/DIG. 18 |
| 3,682,254 | 8/1972 | Hoeffleur | 173/49 |
| 3,866,693 | 2/1975 | Century | 173/49 |

*Primary Examiner*—Ernest R. Purser
*Attorney, Agent, or Firm*—Edward A. Sokolski

[57] ABSTRACT

A vibratory drive system for use in spalling a road surface, cutting rock, etc. Vibratory energy is generated by means of an orbiting mass oscillator, the output of which is rectified by means of a rectifier to provide unidirectional pulses to a cutting tool. In the interests of making the system compact and providing controlled operational parameters, non-resonant operation is employed, optimum drive to the tool being achieved by biasing the oscillator against the tool and by providing a shoulder which fixes the uppermost position of the tool when it is being biased against a load. The tool position and the design of the oscillator are such that the oscillator housing contacts the tool near the mid-down stroke (90°) of the oscillatory vibration cycle, this being the point of highest vibratory velocity and kinetic energy. In this manner, the highest possible delivery of energy to the tool is provided.

14 Claims, 11 Drawing Figures

NON-RESONANT CYCLIC DRIVE SYSTEM EMPLOYING RECTIFICATION OF THE CYCLIC OUTPUT

This invention relates to the cyclic driving of rock and concrete cutting tools with unidirectional (rectified) drive pulses, and more particularly to such a system employing an orbiting mass oscillator and a cutting tool which are positioned and biased so as to deliver optimum energy to the tool in a non-resonant vibration system.

In a number of my prior systems, such as described in U.S. Pat. No. 3,367,716, issued Feb. 6, 1968, the use of an orbiting mass oscillator, the output of which is rectified to provide unidirectional pulses to a cutting tool for cutting rock and the like, is described. These prior systems employ resonant vibration in their implementation which at the cyclic frequencies employed generally involves a rather bulky structure and also present difficulty in controlling amplitude. In certain instances, it is not possible to provide the relatively massive structure needed for an efficiently operating resonant system at the frequencies utilized (usually of the order of 100 hertz). A resonantly operating system affords very high amplitude outputs which are highly desirable in systems for cutting rock and concrete which need a substantial amount of energy. Thus, if it is not possible to employ resonance, some other means must be found for obtaining the high level energy required without resorting to overly massive machinery.

The present invention solves both problems in a non-resonant system having a relatively low bulk as compared with prior art resonant systems and having predetermined amplitude. The efficient generation of high level cyclic energy is achieved in the system of the invention by a combination of cooperative components as follows: First, the system employs an orbiting mass oscillator wherein the radius of the orbital path of the center of gravity of the rotor is predetermined at an optimum value by proper choice of material, length of rotor and the radial dimension thereof. Further, the mass of the oscillator housing is selected to cooperate in a counter-balancing effect with the cyclic impulse generated as a result of the predetermined optimum rotor center of gravity and mass. This design operates to provide a fixed maximum cyclic stroke of the housing as well as good energy storage during the cyclic period. Also, a reference stop is provided for the working tool, this reference stop determining the maximum upward excursion of the tool when it is biased against the load. This reference stop determines the point in the cyclic oscillatory period when the rectified drive pulses are applied to the tool which is chosen to provide maximum energy to the tool. Additionally, a bias spring is employed to bias the oscillator housing towards the tool. This biasing is set and the reference stop is positioned such that the energy transfer provided by the rectified unidirectional pulses occurs near the midpoint of the down stroke, i.e., the 90° point, of the cyclic vibration. This assures the optimum transfer of energy because at this point velocity of the vibration is highest and the largest amount of kinetic energy is available. Thus, it is important that the spring bias or other bias such as gravity be provided such that this optimum condition occurs.

In a situation with a fairly high acoustic impedance work load, such as in mechanically spalling a concrete road surface, it is desirable to have a short stroke (typically ¼") with the oscillator on the relatively heavy side and running at a frequency of the order of 100 hertz. Such a short stroke high force oscillator affords a good impedance match to this type of load. In a situation where a lower impedance load is involved, such as in peeling coal from an earthen seam, the oscillator rotor can have a larger orbit of its center of gravity and the oscillator housing can be relatively lightweight as compared with the rotor mass such that the oscillator has a relatively long stroke (of the order of ½" or more) and operates at a frequency of the order of 80 hertz. In this type of situation, the bias spring or equivalent must have a relatively long travel as well as enough preload and/or spring rate in order to permit a long stroke for the oscillator while still having it catch the cutting tool at a high velocity phase of the oscillator housing vibration cycle. Experience has indicated that it is desirable to not have the oscillator housing cyclic velocity in excess of about 20 feet per second. Too high a velocity reduces the relative percentage of dwell time (contact phase) of the rectifier.

It is therefore an object of this invention to provide an improved non-resonant vibration system providing unidirectional pulses to a load which has substantially less bulk than prior art resonant systems.

It is another object of the invention to provide a vibration system having a predetermined maximum stroke of its oscillator.

It is still another object of this invention to provide means in a non-resonant orbiting mass vibration system for providing energy to a tool at an optimum point in the vibration cycle.

Other objects of this invention will become apparent as the description proceeds in connection with the accompanying drawings, of which:

Figure 1:
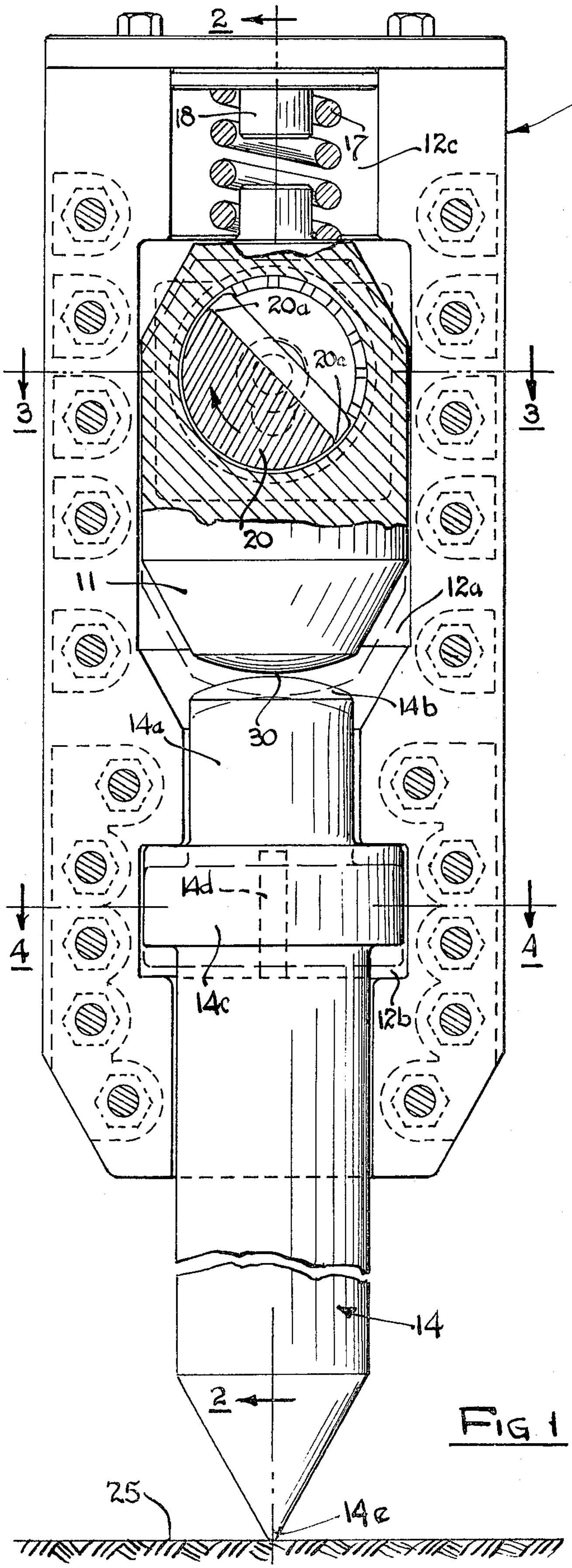
FIG. 1 is an elevational view in cross section of a first embodiment of the invention.
Figure 5:
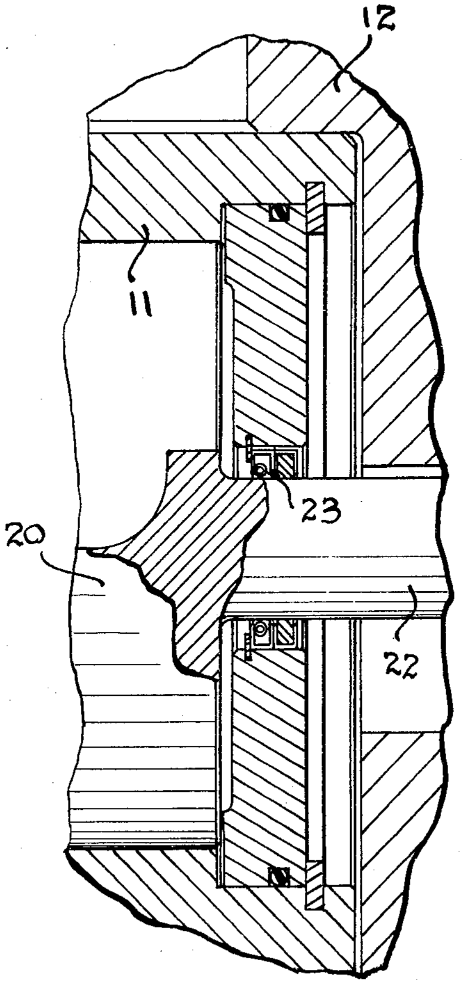
FIG. 5 is a cross-sectional view illustrating the details of the rotor drive of the first embodiment.

A significant feature of this invention is the inductive oscillator rectifier embodying a unique journal bearing rotor in the oscillator. The inductive force is generated by the constraint of the journal bearing which retains an eccentric mass in a closed circuit path such as a circle, or an ellipse if the net motion of the oscillator is substantially a linear reciprocation. The journal bearing carrying the eccentric or unbalanced mass is at the beginning of the oscillating system, i.e., where the rotary turning force from the prime mover rotates the journal bearing and thereby induces the periodic force by virtue of the journal bearing supporting and constraining the path of the eccentric mass. The eccentric mass can be an overhung weight hanging on the shaft of the journal bearing, and in some high speed high frequency versions, the shaft itself may be of unbalanced construction, thus obviating the need for overhung masses.

The important feature being emphasized here is that such a rotating vector load in the journal bearing tends to result in a non-reversing load in the mating surfaces of the bearing. The mating surface portion of the bearing is constantly loaded radially along one longitudinal portion of the centrifugally loaded rotating shaft, in the more typical forms where the shaft carries the unbalanced mass. The shaft responds to the unbalanced force always tending to swing out, and thereby holding the always turning near portion of the turning shaft continually against the journal in which it is turning. This non-reversing loaded portion of the shaft of the journal bearing is thus continually tending to squeeze out from between this highly loaded portion of the shaft and its mating journal surface the very necessary oil film which holds the two metal surfaces apart, and prevents destructive metal to metal contact.

On the other hand, with the novel combination of this invention, the sudden decelerative interruption of the motion of the oscillator housing, caused by the closing of the rectifier gap, tends to momentarily decelerate vertically and to pull the shaft away from the otherwise continual forceful contact with the journal bearing in the housing. In a non-resonant system, the phasing is such that the swinging vector of a heavy unbalanced mass is not lined up with the rectifier at the instant of rectifier gap closing. In other words, in a non-resonant system, the bearing load and the rectifier deceleration force are not lined up and additive to the bearing load. In fact, running freely in space, the motion of the housing is in opposite phase to the vector of the inductive mass.

The important point here is that the rectifier causes a desirably phased load reversal (fluctuation), or load reduction, in the bearing film. This gives the oil pressure supply a "breather" so that it can instantaneously build up a replenished thick oil film next to the shaft, ready for the motivating centrifugal load to build up again, until the next respite provided by the rectifier's stoppage deceleration effect.

Moreover, this load reversal caused by the rectifier can be so great as to cause the oil layer on the normally unloaded side of the shaft to squirt around the annulus and further help build up the "respite" oil film augmentation for the normally loaded side of the shaft.

Thus with the rectifier, we have a reversing load which provides a tremendous gain in the load carrying ability of the journal bearing oscillator. It provides more powerful oscillators, handling larger rotating unbalanced motivating masses, and all this possible at higher frequency, while at the same time giving long-life trouble-free bearing conditions.

Referring now to FIGS. 1–5, a first embodiment of the invention has been illustrated. Oscillator housing 11 is slidably supported for reciprocal motion in cavity 12*a* formed in main housing 12. Also slidably supported in a narrowed portion of the cavity 12*a* is tool member 14 which may be a cutter for cutting rock, spalling concrete, etc. Tool member 14 has an upper shaft portion 14*a* with a dome-shaped top 14*b*. Extending outwardly from upper shaft portion 14*a* is a stop member 14*c* which fits into a widened portion 12*b* of the housing cavity and functions in conjunction with this widened portion to fix the upper limit position of the tool. Stop member 14*c* may have a slot 14*d* in which key member 15, which is fixedly attached to the housing, rides, and prevents the tool from rotating.

Oscillator housing 11 is resiliently urged downwardly by means of bias spring 17 which is fitted over post member 18. Spring 17 extends upwardly from the housing and is contained within the top portion 12*c* of the cavity, abutting on one end against the inner wall of the main housing and on the other end against the top wall 11*a* of the oscillator housing. Rotatably supported in oscillator housing 11 is oscillator rotor 20 which, in this particular embodiment, is in the form of a half-moon. The oscillator rotor 20 is driven by a drive shaft 22 which passes through seal 23. The shaft is rotatably driven through universal joint 21 which is coupled to a prime mover (not shown) such as an electric motor, hydraulic motor or gasoline engine. The oscillator is preferably of the type having an oil cushion between the rotor and the housing such as described in my copending application Ser. No. 27,935, filed Apr. 6, 1979. This oscillator, as fully described in this copending application, includes a journal bearing with a turned-in leading edge 20*a* and an oil feed system which engenders the formation of a thick layer of oil between the rotor and the housing which provides cushioning therebetween, and thus prevents damage to these components in the face of the sharp jarring vibration produced as the tool strikes against hard rock formations and the like.

With the tool in operating position and the cutter head 14*e* biased against a rock formation 25, the dome 14*b* at the top of the tool abuts against the bottom of oscillator housing 11 with the housing being resiliently retained between spring 17 and the tool. When rotor 20 is rotatably driven (typically at a speed of the order of 100 rps), housing 11 is caused to vibrate reciprocally in a longitudinal mode by virtue of the vibratory energy generated with the rotation of the eccentrically weighted rotor. During the upward vibratory strokes, the oscillator housing separates from the tool, leaving a gap which may be of the order of a quarter of an inch; the, during the downward stroke, the oscillator housing hammers against tool 14. In this manner "rectification" of the cyclic energy is achieved and unidirectional vibratory pulses are imparted to the tool. Spring 17 is chosen, as well as the upper limit of travel of the tool, which of course is determined by the location of the stop member 14*c* thereon, such that the oscillator housing initially contacts the domed portion 14*b* of the tool at a point which occurs in about the midpoint of the downward oscillatory stroke (i.e., the 90° point in the vibratory cycle). This is important to achieve the highest possible force on the tool in view of the fact that at this point in the stroke the velocity is highest and thus maximum force is imparted to the tool.

Figure 2:
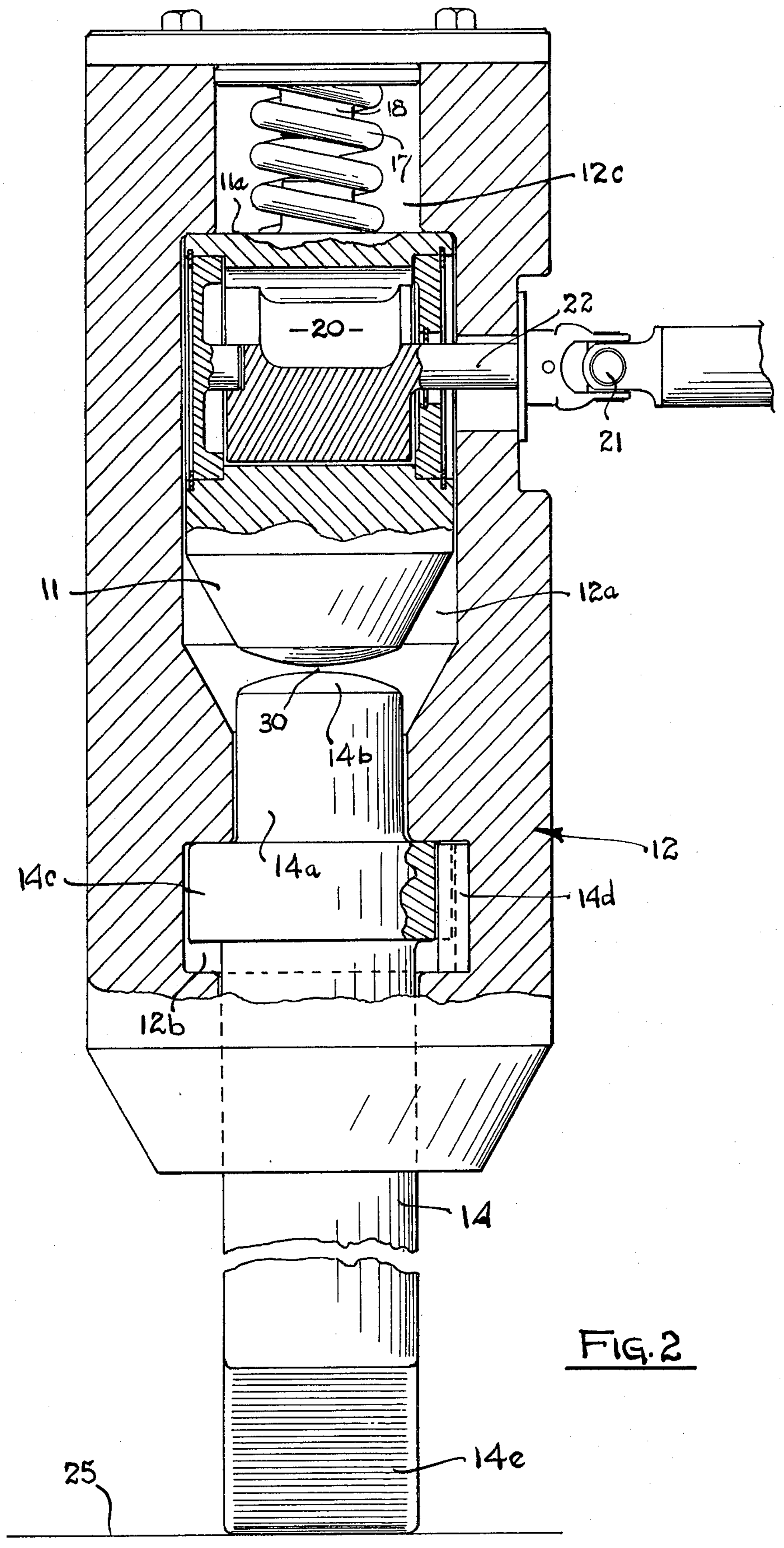
FIG. 2 is a cross-sectional view taken along the plane indicated by 2—2 in FIG. 1.
Figure 3:
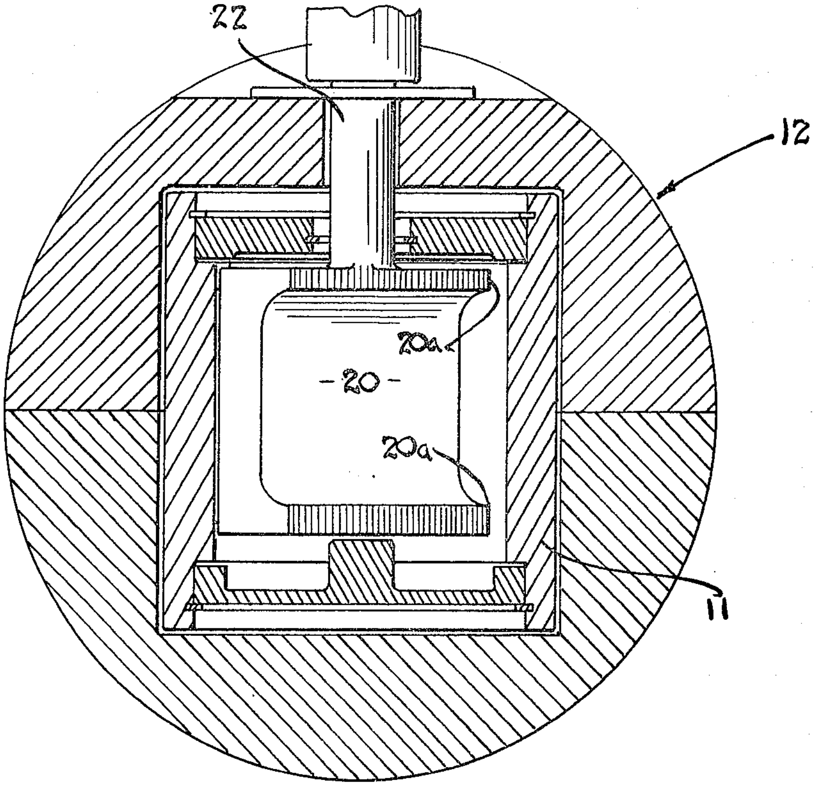
FIG. 3 is a cross-sectional view taken along the plane indicated by 3—3 in FIG. 1.
Figure 4:
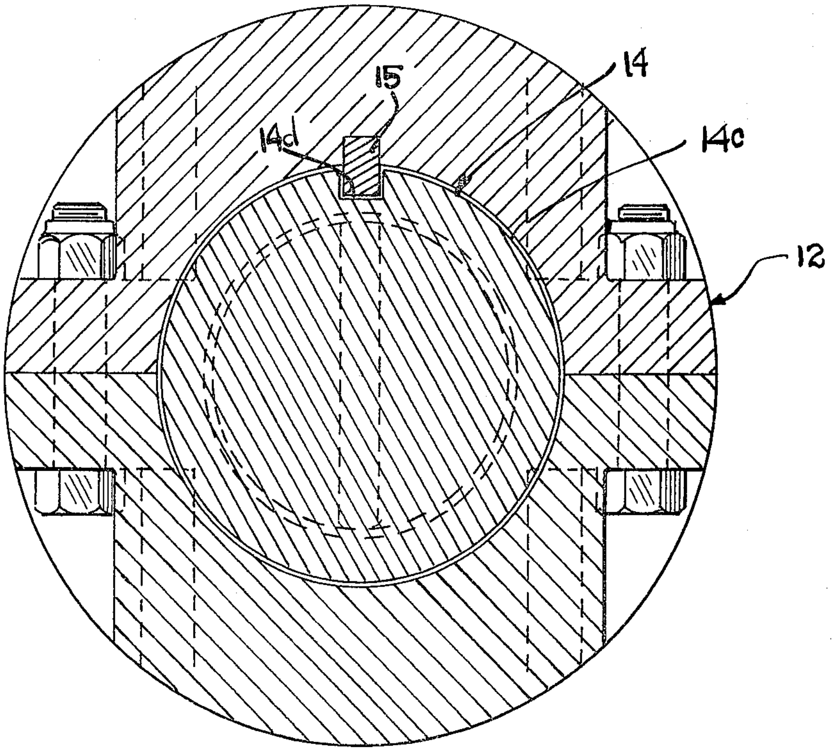
FIG. 4 is a cross-sectional view taken along the plane indicated by 4—4 in FIG. 1.

For purposes of illustration, oscillator housing 11 is shown in FIGS. 1 and 2 near the peak of its upward vibratory stroke such that rectifier gap 30 appears between this housing and the top of the tool. The dotted line in FIG. 1 illustrates the tool and the oscillator housing near the bottom of the downward stroke with the housing abutting against the tool and driving it into rock formation 25.

Figure 6:
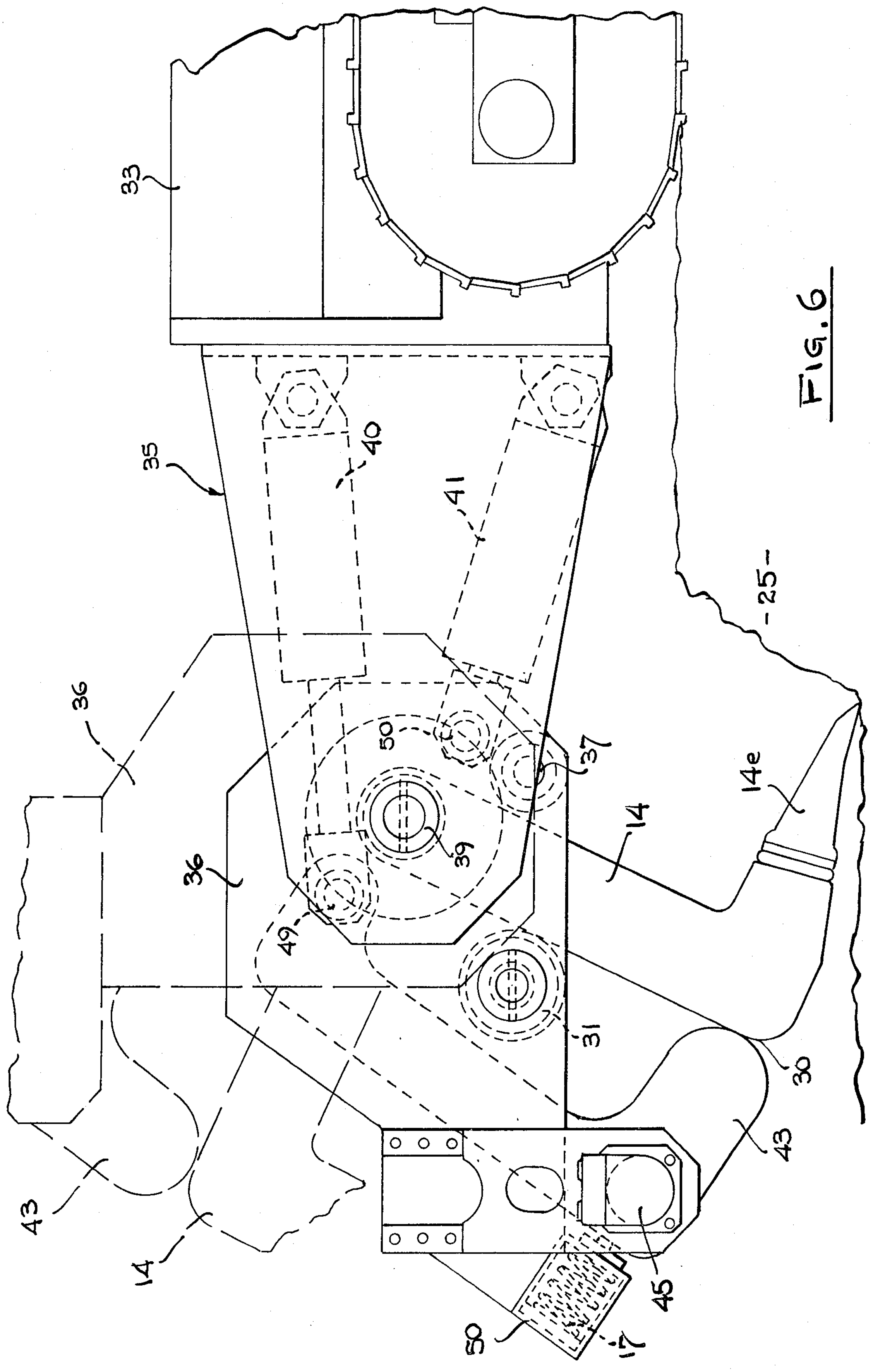
FIG. 6 is a side elevational view illustrating a second embodiment of the invention installed in a tractor-mounted rock-cutting tool.
Figure 7:
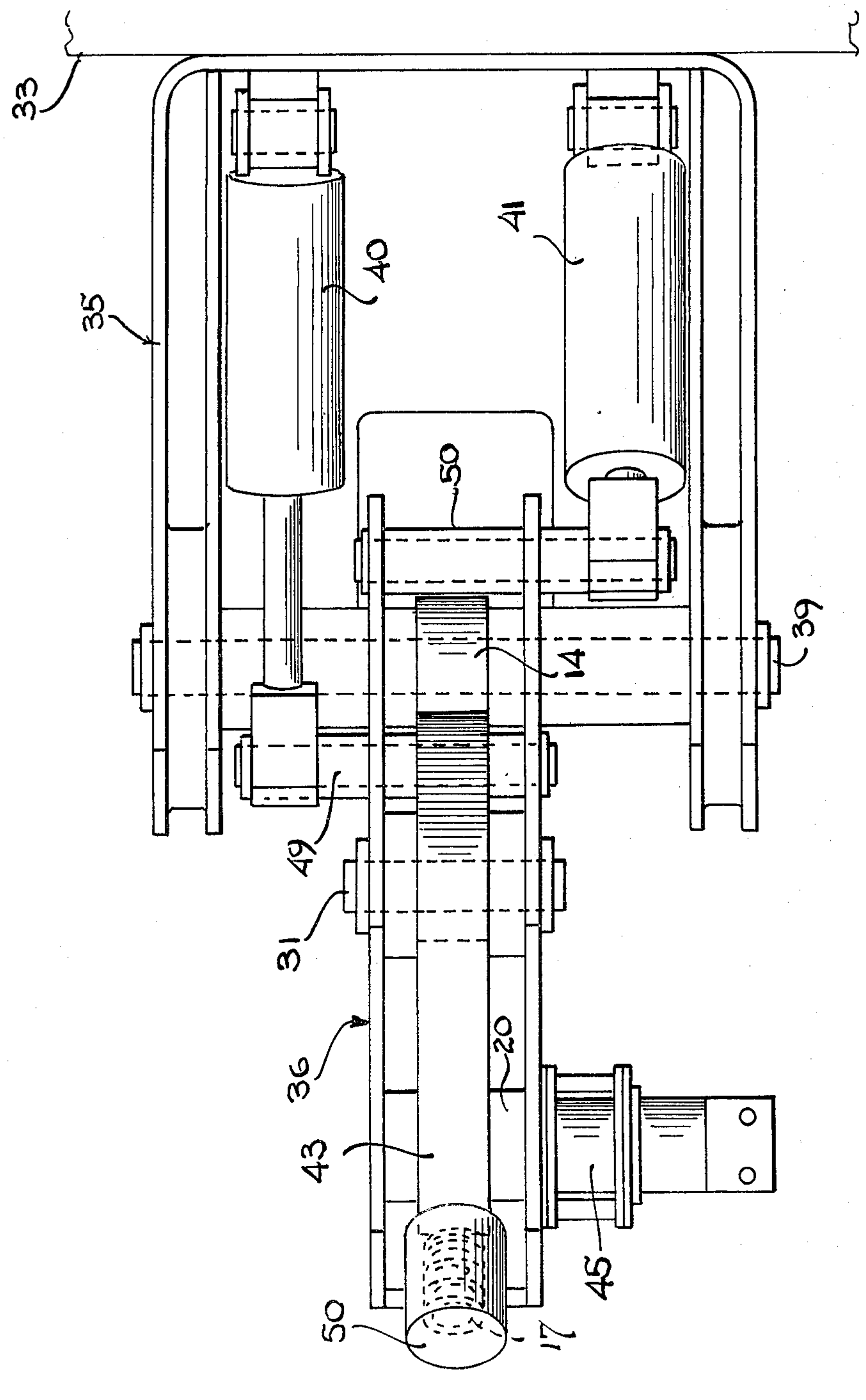
FIG. 7 is a top plan view of the rock cutting tool shown in FIG. 6.
Figure 8:
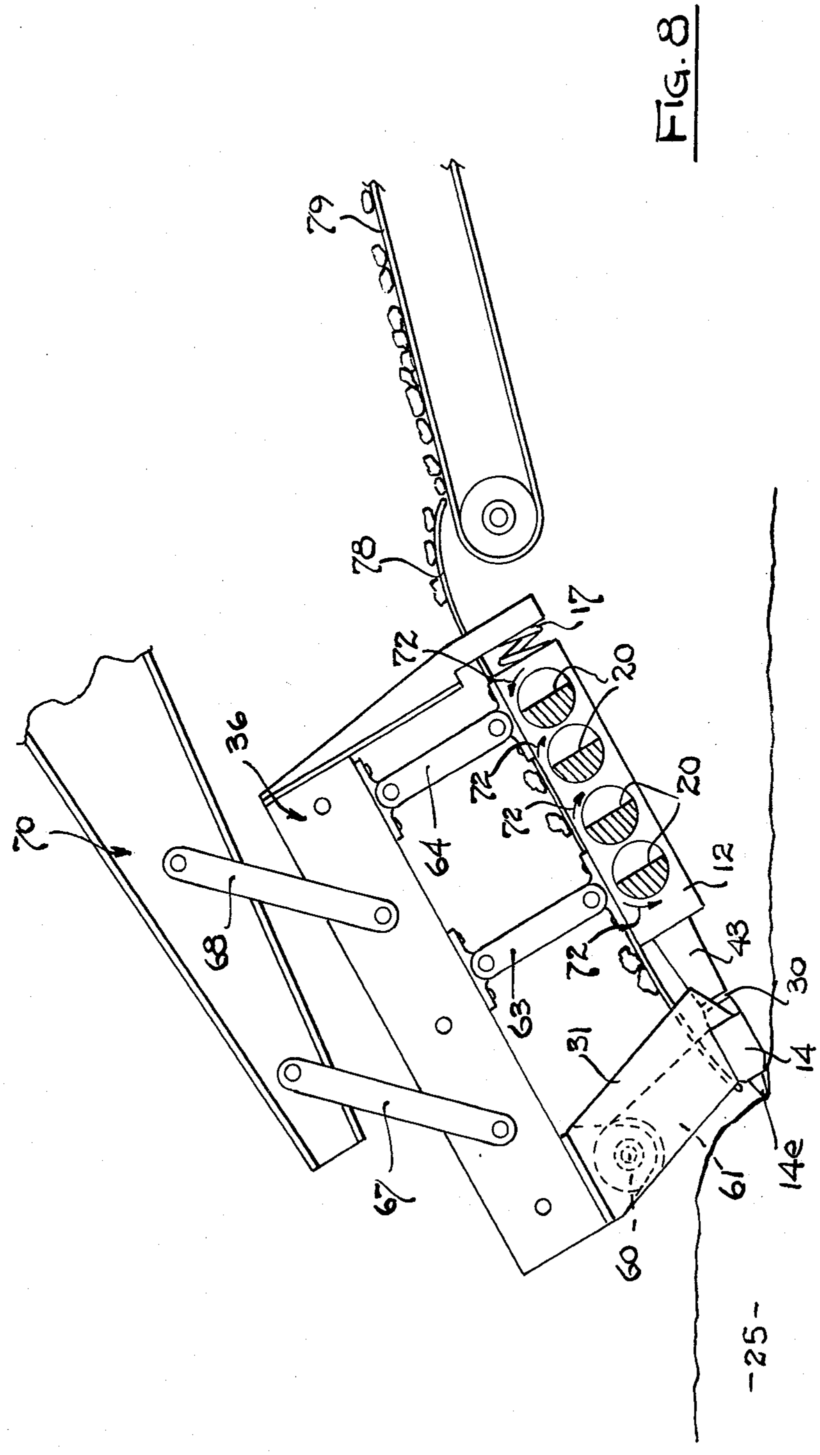
FIG. 8 is a side elevational view schematically illustrating a third embodiment of the invention for use in spalling concrete pavement.

Referring now to FIGS. 6 and 7, a second embodiment of the invention incorporated into a rock chisel is shown. Attachment assembly 35 is fixedly supported on tractor 33. Pivotally supported on attachment assembly 35 on cross beam 39 is tool mounting subassembly 36. Mounting assembly 36 may be pivotally positioned by means of hydraulic cylinder 41, the actuation shaft of which is coupled to arm 50 which in turn is connected to assembly 36. Tool assembly 14 is pivotally supported on cross beam 39 of assembly 36.

Tool drive member 43 is pivotally supported on assembly 36 by means of pin member 49 to which it is fixedly attached, this pin member being pivotally mounted on assembly 36. The actuation shaft of hydraulic cylinder 40 is coupled to pin member 49 so that this pin member may be driven to position assembly 36 as may be necessary. Bias spring 17 is mounted in housing 50 which is supported on assembly 36 and resiliently urges drive member 43 towards the tool 14, rectifier gap 30 appearing between these two members during a portion of the vibratory drive cycle as in the previous embodiment. Orbiting mass oscillator 20 is supported in drive member 43 and is rotatably driven by means of a motor 45, the motor 45 being fixedly supported on assembly 36. Oscillator 20 is the same type of oscillator as used in the first embodiment and operation of this second embodiment is essentially the same as that of the first embodiment, like numerals having been given to components performing the same functions as in the first embodiment.

Stop member 31 is mounted on assembly 36 and operates to limit the upward travel of tool assembly 14 as in the first embodiment, this limit position being adjusted such that initial contact is made between drive member 43 and the tool at a point in the drive cycle corresponding approximately to the midpoint of the downward vibratory excursion (as in the first embodiment). A downward stop member 37 is also provided as in the first embodiment.

It thus can be seen that as in the first embodiment the oscillator 20 (by virtue of its attachment to drive member 43 which thus essentially becomes part of this drive member) is movably supported relative to the tool member 14 which is also movably supported. Further, spring member 17 resiliently urges the oscillator and the drive member towards the tool with the bias of the spring and the positioning of stop member being such that initial contact between the drive member 43 and the tool occurs at an optimum high velocity point in the vibration cycle, thus providing maximum energy to tool head 14e for cutting into rock formation 25. Hydraulic cylinders 40 and 41 are used to position the tool subassembly 36, as may be desired, and can be used to lift the whole assembly up off the road for travel from one work location to another.

Referring now to FIGS. 8–11, a third embodiment of the invention is illustrated, this embodiment being suitable for spalling or planing a pavement surface. In this embodiment, like numerals have been used to identify parts which have the same functions as in the previous embodiments. Tool support assembly 36 is pivotally suspended from the main frame 70 of the equipment by means of pivot links 67 and 68. Oscillator housing 12 in turn is pivotally supported from support assembly 36 by means of pivot links 63 and 64. Oscillator rotors 20, as with the previous embodiments, have a cross section in the general shape of a half-moon and are rotatably driven by suitable motor means (not shown). In the third embodiment, four rotors are employed, pairs of these rotors being driven in opposite directions as indicated by the arrows 72 in FIGS. 8 and 10 so as to cancel out sidewise forces. Tool member 14 is pivotally supported on assembly 36 by means of arm 61 which is pivotally supported on this assembly on pivot pin 60. Stop member 31 which is fixedly supported on assembly 36 limits the upward travel of tool 14 as in the previous embodiments.

Figure 10:
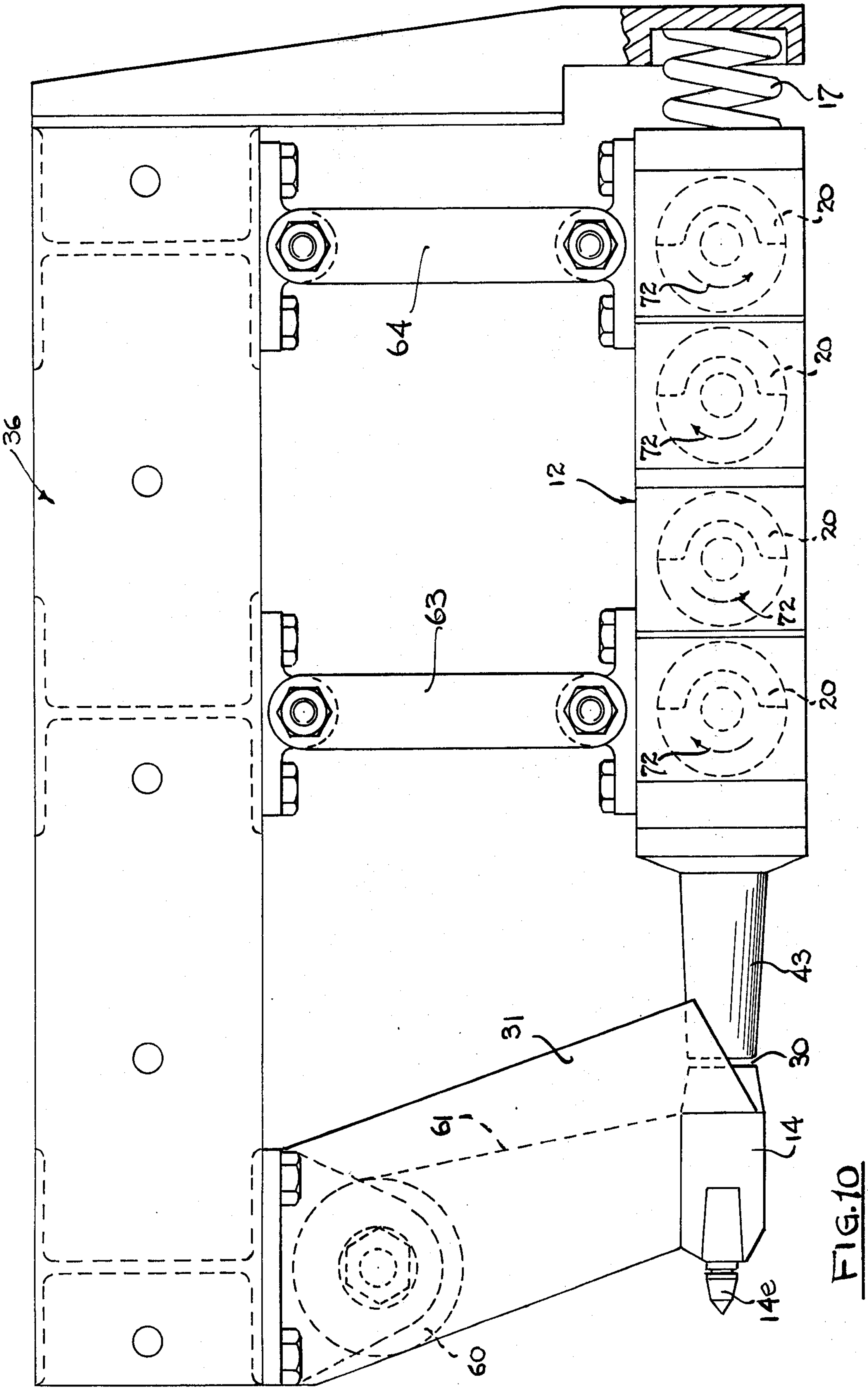
FIG. 10 is a side elevational view showing the cutter and drive mechanism of the third embodiment.

Oscillator housing 12 is resiliently urged towards tool 14 by means of gravity and may be aided by spring 17 with a rectifier gap 30 being formed between drive member 43, which is fixedly attached to the oscillator housing, and the tool 14. As in the previous embodiments, stop member 31 is positioned, and the design parameters of the weight of the oscillator, spring 17, and the other elements chosen such that initial contact between drive member 43 and the tool occurs near the midpoint of the downward vibrational excursion. Thus, high level vibrational energy is transferred to the tool to effect efficient spalling action on concrete surface 25. Material spalled from the surface moves upwardly on tray 78 and is carried away on conveyor belt 79. FIG. 10 is a blown-up view of the tool assembly just described.

Figure 9:
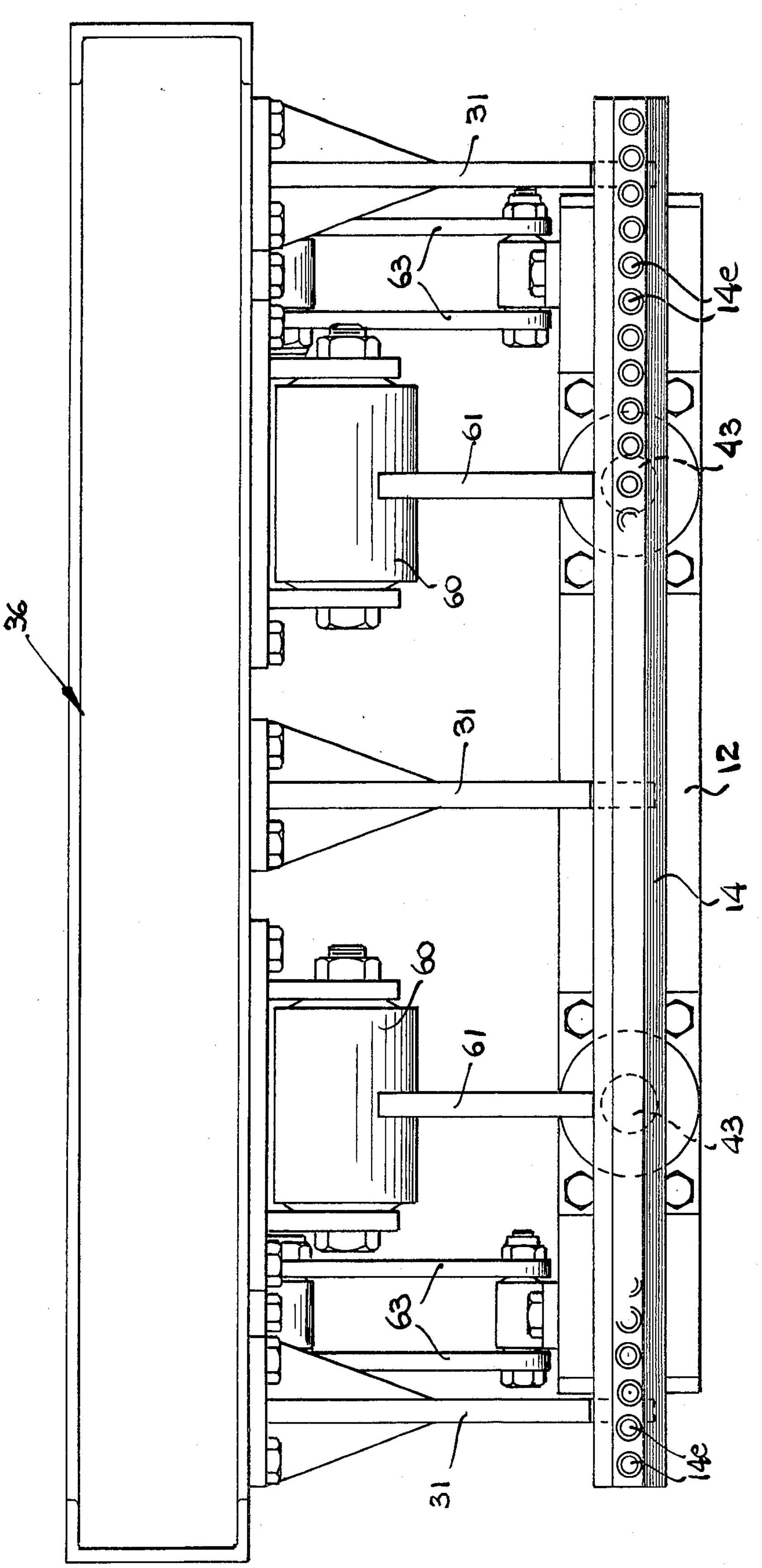
FIG. 9 is an end elevational view of the third embodiment.
Figure 11:
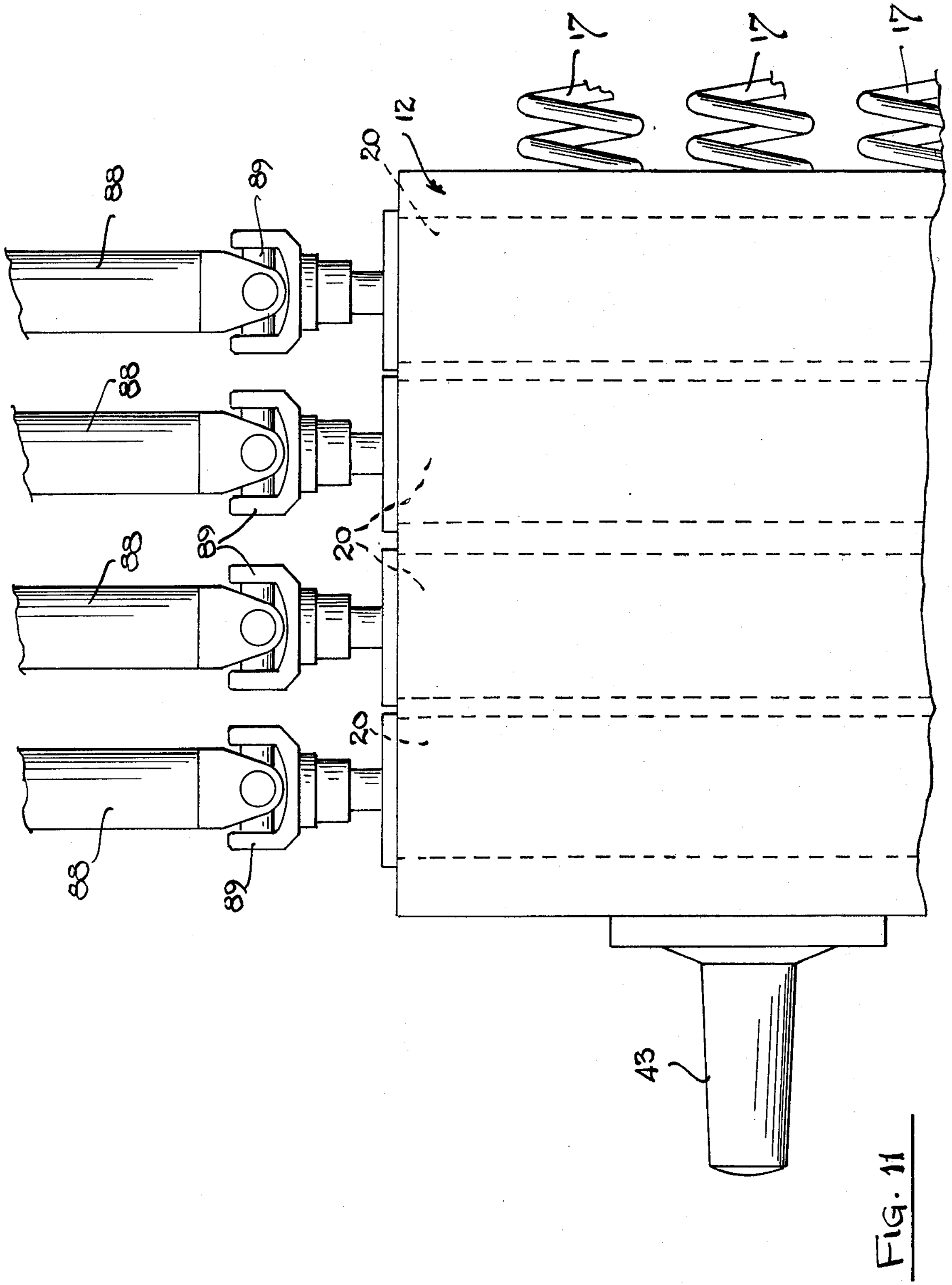
FIG. 11 is a top plan view illustrating the drive mechanism of the third embodiment.

Referring now particularly to FIGS. 9 and 11, the details of construction of the third embodiment are illustrated. Four oscillator rotors are employed, the oscillator housing 12 being pivotally suspended from assembly 36 by means of pivot bars 63 and 64 (bar 64 shown in FIG. 10). The oscillator rotors 20, as can be seen in FIG. 11, are elongated and are rotatably driven by means of drive shafts 88 which are coupled to the rotors through universal joints 89. Drive shafts 88 are rotatably driven by suitable motive means (not shown). The oscillator housing 12 has a pair of drive members 43 and is resiliently urged towards the tool member 14 by means of a plurality of springs 17 or by gravity alone.

The tool assembly comprises an elongated tool holder 14 which is pivotally supported on assembly 36 by means of linkage bars 61 which couple the tool holder to pivotal support bushings 60. Tool holder 14 has a plurality of cutters 14e mounted thereon. As already noted, operation is essentially the same as for the other embodiments with high level cyclic energy being transferred to the tool holder from the oscillator housing at the optimum point in the downward portion of the vibratory cycle.

While the invention has been described and illustrated in detail, it is to be clearly understood that this is intended by way of illustration and example only and is not to be taken by way of limitation, the spirit and scope of this invention being limited only by the terms of the following claims.

I claim:

1. A non-resonant cyclic drive system for cutting into a hard material load by means of unidirectional cyclic force pulses comprising an orbiting mass oscillator including an eccentric rotor and a housing for rotatably supporting said rotor, means for driving said oscillator so as to induce non-resonant longitudinal vibration of said housing, means for supporting said housing for reciprocal motion substantially in the directions of said longitudinal vibration, a cutting tool having a cutter head, said cutter head being biased against said load by the weight of said tool, means for supporting said tool for reciprocal motion substantially in the directions of said longitudinal vibration, means for biasing said housing towards said tool, and stop means for limiting the furthest travel of said tool toward said housing to a predetermined position, a predetermined gap being formed between said housing and said tool at the furthest vibratory excursion of said housing away from said tool and said housing initially contacting said tool during its vibratory excursion towards said tool approximately at the midpoint of said last-mentioned excursion.

2. The system of claim 1 wherein the bias provided by said biasing means and the position of said stop means are predetermined to fix the initial contact point between the housing and the tool.

3. The system of claim 1 wherein said means for supporting said oscillator housing for reciprocal motion comprises a main housing in which said oscillator is slidably supported.

4. The system of claim 3 wherein the means for supporting said tool for reciprocal motion comprises a housing in which said tool is slidably supported.

5. The system of claim 3 or 4 wherein said stop means comprises a widened portion of said tool, said housing for said tool having a widened portion corresponding in width to the widened portion of the tool, but longer than said widened tool portion and into which said widened tool portion is slidably fitted for limited slidable motion along the longitudinal axis of the tool.

6. The system of claim 5 wherein said biasing means comprises a coil spring positioned between the top of said oscillator housing and said main housing.

7. The system of claim 1 wherein the means for supporting the oscillator housing comprises means for pivotally supporting said oscillator housing and the means for supporting the tool comprises means for pivotally supporting the tool.

8. The system of claim 7 wherein the stop means comprises a stop member positioned in a predetermined location between the cutting tool and the oscillator and means for fixedly supporting said stop member relative to said cutting tool.

9. The system of claim 1 wherein the means for rotatably supporting said rotor comprises a journal bearing having an oil film formed therein, there being a substantially constant rotating force vector developed by the rotor with a portion of the rotating element of said bearing in substantially constant radial force bearing load, and the eccentric mass of the rotor of such a size as to cause the contact bearing force to be directed radially away from the gap when the gap closes, the deceleration of the oscillator housing caused with the closing of said gap causing the bearing load to be momentarily reduced so as to momentarily facilitate the flow of oil into the region of said rotating element portion of the bearing.

10. The system of claim 9 wherein said journal bearing has a turned-in leading edge to engender the formation of a thick layer of oil in said bearing.

11. A machine for spalling or planing a concrete surface comprising a main frame, a tool support assembly, means for pivotally supporting said assembly from said main frame, an orbiting mass oscillator including an oscillator housing and two pairs of eccentric rotors rotatably supported in said housing, means for rotatably driving one pair of said rotors in one direction and the other pair of said rotors in a direction opposite to said one direction to cause vibration of said oscillator housing in a longitudinal vibration mode with transverse vibrations being cancelled out, means for pivotally supporting the oscillator housing on said tool support assembly for reciprocal motion substantially in the directions of the longitudinal mode of vibration of the oscillator housing, a tool member, means for pivotally supporting the tool member on the tool support assembly for reciprocal motion substantially in the directions of the longitudinal mode of vibration of the oscillator housing, biasing means positioned between the main frame and the oscillator housing for resiliently urging the housing towards said tool member, and stop means for limiting the furthest travel of said tool member towards said housing at a predetermined position, a predetermined gap appearing between the housing and the tool at the furthest vibratory excursion of the housing away from the tool and the housing initially contacting the tool during its vibratory excursion towards the tool approximately at the midpoint of said last-mentioned excursion.

12. The machine of claim 11 wherein said oscillator rotors are elongated and the biasing means comprises a plurality of springs.

13. The machine of claim 12 wherein said tool member comprises an elongated tool holder and a plurality of cutter bits mounted on said holder.

14. The system of claims 9 or 13 wherein a sonic rectifier is formed between the oscillator housing and the tool, said rectifier engendering a periodic load reduction on the bearing to facilitate the formation of said oil layer therein.

* * * * *